B. SETTERGREN.
CLUTCH GEAR FOR HUBS OF VEHICLES.
APPLICATION FILED JUNE 6, 1906.
922,965.
Patented May 25, 1909.
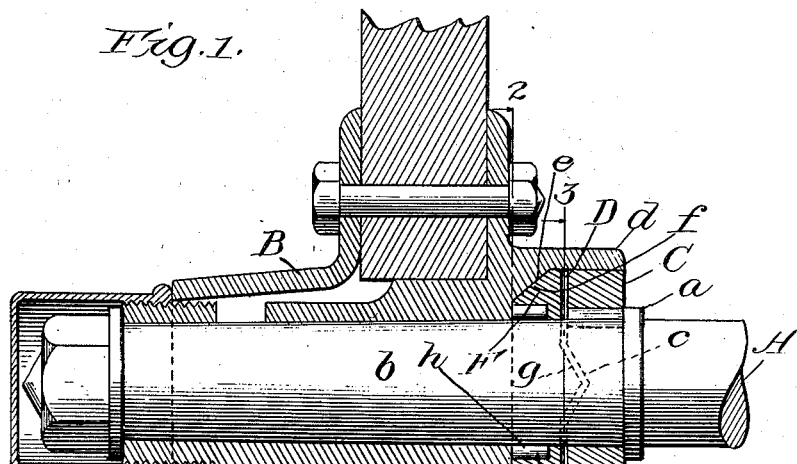
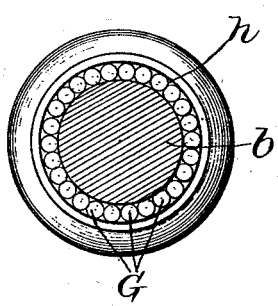
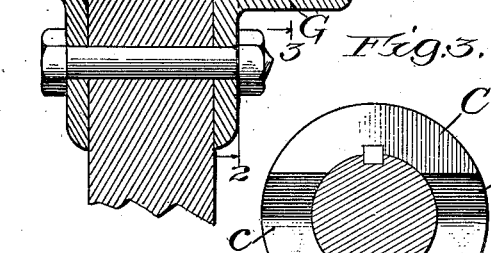
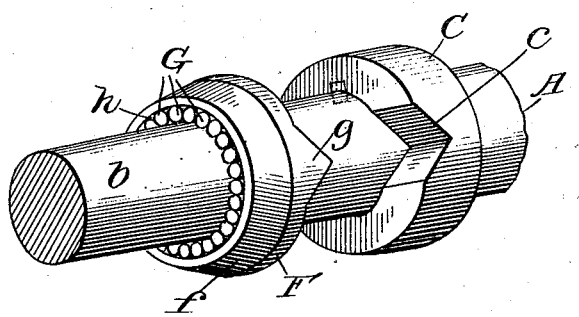
Witnesses:
Inventor.
Bernhard Settergren
By Frank D. Thomason
Atty.

UNITED STATES PATENT OFFICE.

BERNHARD SETTERGREN, OF CHICAGO, ILLINOIS, ASSIGNOR TO JOHN GUBBINS, OF CHICAGO, ILLINOIS.

CLUTCH-GEAR FOR HUBS OF VEHICLES.

No. 922,965.     Specification of Letters Patent.     Patented May 25, 1909.

Application filed June 6, 1906. Serial No. 320,404.

*To all whom it may concern:*

Be it known that I, BERNHARD SETTERGREN, a citizen of the United States, and a resident of Chicago, in the county of Cook and State of Illinois, have invented certain new and useful Improvements in Clutch-Gears for the Hubs of Vehicles, of which the following is a clear, full, and exact description.

My invention relates to the driven wheels of vehicles, and particularly automobile wheels, concerning which it has been said that: "Slipping and skidding are two different things. Any wheel vehicle may slip on a sufficiently slippery surface. An automobile is the only thing that skids, and it may skid even if the surface is not slippery. Skidding is caused by the differential gear. When the driving wheels meet an unequal resistance there is a sudden transference of power to the wheel meeting the less resistance. This wheel is driven ahead at increased velocity and gives the car a side thrust which tends to throw it out of line. When this happens, all that holds the car in line is the traction of the front wheels. If they lose traction the car will skid. The same thing is true in rounding a curve. The outer wheel does the driving and will keep the car going right around in a circle unless the front wheels can straighten it out."

The object of my invention is to provide a simple and comparatively inexpensive friction gear for the hubs of said driven wheels, which enables both the wheels of a revolving axle to be driven alike, and when rounding a curve, and the outer wheel exceeds the speed of the inner wheel, it permits the former to run free of the axle until the speed of the axle catches up with it, when said axle again engages; which enables the power of the revolving axle to always exert itself on the wheel encountering the greatest resistance when the resistance of the two wheels vary. Should this resistance be equally distributed, my invention enables both wheels to be driven positively, but should either wheel be checked or retarded the other may slip. This I accomplish by the means hereinafter fully described, and as particularly pointed out in the claims.

In the drawings:—Figure 1 is a vertical section through the hub of a wheel embodying my invention. Fig. 2 is a transverse section taken on dotted line 2, 2, Fig. 1. Fig. 3 is a transverse section taken on dotted line 3, 3, Fig. 1. Fig. 4 is a diagrammatical view showing in perspective the collar and clutch in their relative positions upon the axle, which latter is indicated by dotted lines.

In the drawings A represents a revolving axle having a circumferential shoulder $a$ between it and its arm $b$, which latter is, preferably, slightly tapered. B represents the hub of a wheel which, with the exception of one part thereof hereinafter referred to, may be of any suitable design or construction. Keyed to arm $b$ of the axle next its shoulder $a$ is a collar C, the outer circumference of which is cylindrical, and the face opposite that next shoulder $a$ is flat and at right angles to the axis thereof, and is provided with V-shaped incut cam surfaces $c$. There may be one or more of these incut cam surfaces $c$ in collar C, but I prefer to have but two of them, as shown in the drawings, and to locate the same diametrically opposite each other.

The part of the hub which, as hereinbefore stated, is an exception to the usual construction and design of hubs, is the portion nearest the shoulder $a$ of the axle. This part $d$ is made greater in diameter than the collar C, and the adjacent end portion of its bore is greatly increased in diameter to form an annular chamber into which said collar enters and closes the mouth of the same. The depth of this chamber D is about twice the width of said collar C, and the inner end of said chamber has its sides beveled inward to form the frictional contact $e$, of a counterpart clutch, which is adapted to be engaged by the correspondingly beveled friction surface $f$ of a ring-shaped clutch F interposed between the inner end of said chamber D and collar C. Clutch F is of such dimensions as to practically occupy the portion of chamber D, between collar C and the inner end of the chamber, excepting that it is permitted to have a slight play in the direction of the length of the axle, say one-sixteenth of an inch, more or less. The side of the clutch F opposed to collar C has one or more cam shaped projections $g$, according to the number of cammed recesses $c$ in said collar, which recesses they are adapted to enter, and of which they form the obverse. The clutch F is adapted to move free on the arm of the axle, and in order to reduce the friction caused by its contact therewith, I prefer to provide it with an annular recess $h$ in the face thereof opposite its cammed projections $g$, and insert the friction rollers G therein, which bear and roll upon said arm. These anti-friction devices may be dispensed with, however, if desired.

In operation, when the axle A is in motion, the collar C revolves therewith and, by reason of the engagement of the inclined sides of the cam projections $g$ of the clutch F, with the inclined side of its recess $c$, forces the clutch F away from it and into contact with the frictional surface of the counterpart clutch $e$ of the annular chamber D of the hub, and transmits the motion of the axle to the wheel. When one wheel travels faster than the other, or when the vehicle is traveling in a curve, and the outer wheel travels faster than the inner wheel, the latter, encountering as it does the greatest resistance, prevents the axle from revolving faster than it. The moment this occurs the outer wheel will revolve freely on the arm $b$ and clutch F, because of the slight movement of the clutch toward the collar, and thus the skidding of the wheel upon the roadway will be avoided.

What I claim as new is:—

1. A double acting friction ratchet mechanism comprising a driving shaft, a friction member actuated by the driving shaft, a driven member actuated by the friction member, said friction member and driven members being each provided with a single engaging frictional surface for driving the driven member in opposite directions.

2. The combination with a revoluble axle, and a wheel loosely journaled on the end of the same, of longitudinally movable means loose on said axle and disconnected from said wheel and provided with a cam that is adapted to transmit the motion of said axle to the wheel but not the motion of said wheel to the axle.

3. The combination with a revoluble axle, and means secured thereto having a cam surface oblique to the axis of the axle, of a hub loose upon said axle, and a device also loose on said axle but movable longitudinally thereon and disconnected from said wheel having a cam surface the counterpart of that of said means by which it is engaged.

4. The combination with a revoluble axle, and a wheel having a hub that is provided with an annular chamber made by expanding its bore at one end, which chamber is provided with a beveled friction surface at its inner end, of longitudinally movable cam-actuated means within said annular chamber disconnected from the axle and wheel and which engages said friction surface and is adapted to transmit the motion of said axle to the wheel, but not the motion of said wheel to the axle.

5. The combination with a revoluble axle, and a wheel having a hub that is provided with an annular chamber of increased diameter at one end of its bore, the inner end of which chamber is provided with a beveled friction surface, of means secured to said axle having a cam surface oblique to the axis thereof, and a device loose on said axle and having a cam surface the counterpart of said means by which it is actuated to engage said beveled friction surface of said hub.

6. The combination with a revoluble axle, and a wheel having a hub that is provided with an annular chamber of increased diameter at one end of its bore the inner end of which is provided with a beveled friction surface, of means secured to said axle having a cam surface oblique to the axis thereof, and a device having a beveled friction contact surface, which is loose on said axle and has a cam surface the counterpart of that of said means whereby it is actuated to cause its beveled friction surface to engage the beveled friction surface in the annular chamber of said hub.

7. The combination with a revoluble axle, and a wheel having a hub that is provided with an annular chamber of increased diameter at one end of its bore, the inner end of which chamber is provided with a beveled friction surface, a collar secured to said axle having a cam surface oblique to the axis thereof, and an annular clutch loose on said axle and disconnected from said wheel and having a cam surface the counterpart of said collar by which it is actuated to engage said beveled friction surface of said hub.

8. In a traction drive for automobiles and the like, a hub formed with a central chamber, a driving axle having an axial arrangement in said chamber, a collar in said chamber and fixed on said axle and provided with a V-shaped cam surface at one end, and a collar arranged loosely in said chamber and formed with a corresponding V-shaped cam surface.

In testimony whereof I have hereunto set my hand and seal this 31st day of May, 1906.

BERNHARD SETTERGREN. [L. S.]

Witnesses:
 FRANK D. THOMASON,
 E. K. LUNDY.